Figure 1:
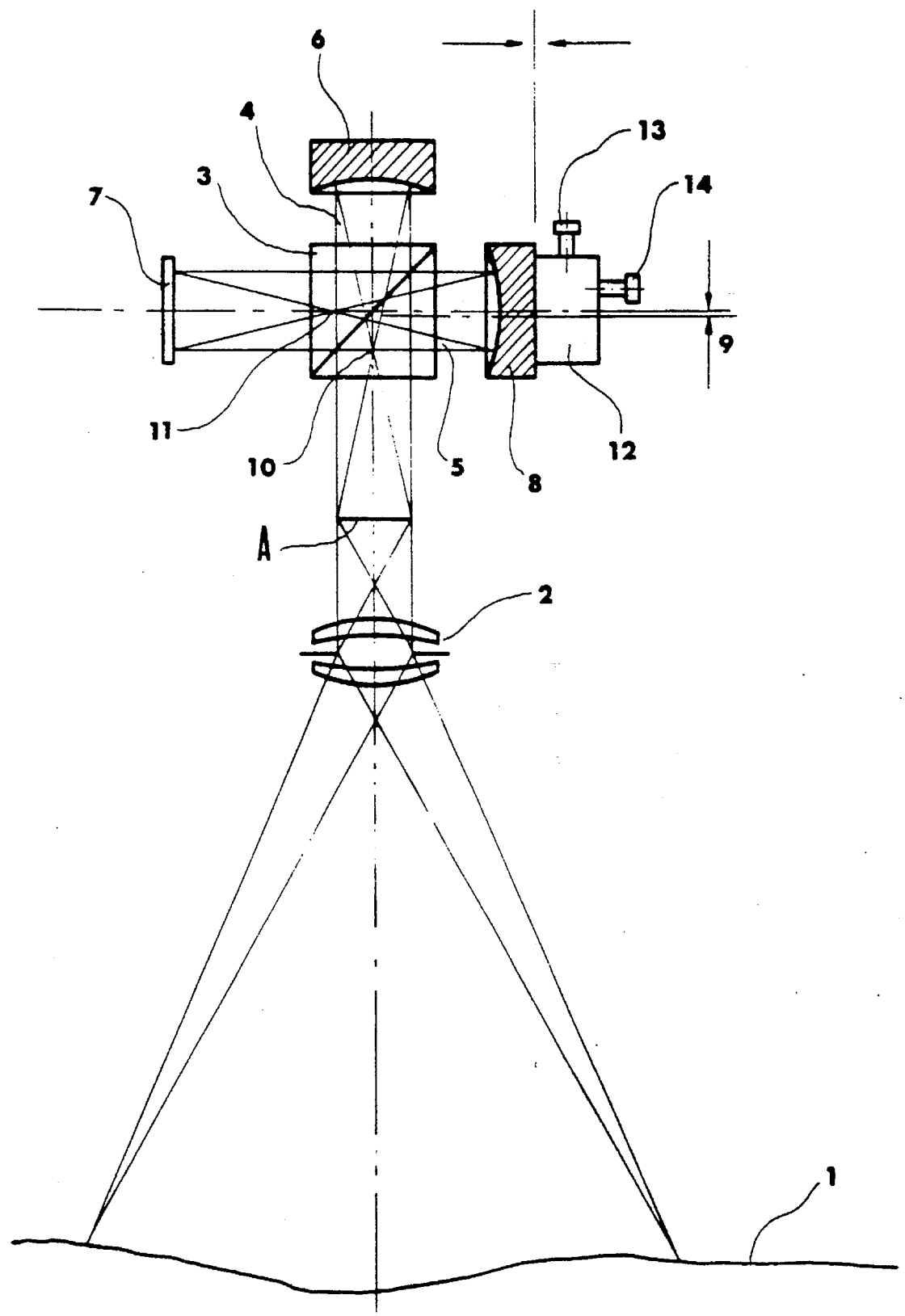

United States Patent [19]

Pfister

[11] Patent Number: 5,493,398
[45] Date of Patent: Feb. 20, 1996

[54] DEVICE FOR OBSERVING TEST-PIECE SURFACES BY THE SPECKLE-SHEARING-METHOD FOR THE MEASUREMENT OF DEFORMATIONS

[76] Inventor: Klaus Pfister, Vagener Weg 76, D-83052 Brucknühl, Germany

[21] Appl. No.: 290,869
[22] PCT Filed: Mar. 1, 1993
[86] PCT No.: PCT/DE93/00172
§ 371 Date: Aug. 29, 1994
§ 102(e) Date: Aug. 29, 1994
[87] PCT Pub. No.: WO93/17311
PCT Pub. Date: Sep. 2, 1993

[30] Foreign Application Priority Data

Feb. 28, 1992 [DE] Germany ............... 42 06 151.2

[51] Int. Cl.⁶ .................................................. G01B 9/02
[52] U.S. Cl. ........................ 356/360; 356/345; 356/353
[58] Field of Search ................................. 356/353, 354, 356/359, 360, 345

[56] References Cited

U.S. PATENT DOCUMENTS

| | | | |
|---|---|---|---|
| 4,193,693 | 3/1980 | Schindler | 356/346 |
| 4,643,576 | 2/1987 | Kanoh et al. | 356/353 |
| 4,660,978 | 4/1987 | Wu | 356/353 |
| 4,725,144 | 2/1988 | Nelson et al. | 356/360 |
| 5,076,695 | 12/1991 | Ichihara | 356/360 |

FOREIGN PATENT DOCUMENTS

| | | | |
|---|---|---|---|
| 0126475 | 11/1984 | European Pat. Off. | |
| 3817561 | 11/1989 | Germany | 356/360 |
| 3611402 | 8/1991 | Germany | |

OTHER PUBLICATIONS

Applied Optics, vol. 24, No. 14, Jul. 15, 1985, pp. 2172–2180, "Fringe Scanning Speckle-Pattern Interferometry".
Applied Optics, vol. 14, No. 3, Mar. 1975, pp. 618, 620, 622, "Speckle-Shearing Interferometric Technique".
Applied Optics, vol. 13, No. 2, Feb. 1974, pp. 233–234, "Field Widened Michelson Spectrometer With No Moving Parts".

*Primary Examiner*—Samuel A. Turner
*Assistant Examiner*—Amanda Merlino
*Attorney, Agent, or Firm*—Dennison, Meserole, Pollack & Scheiner

[57] ABSTRACT

Subject of the invention is a shearing measurement head, which has a very compact structure by the use of concave mirrors in a Michelson interferometer arrangement, allows phase-shifting and can be operated optionally using an attached objective.

10 Claims, 1 Drawing Sheet

DEVICE FOR OBSERVING TEST-PIECE SURFACES BY THE SPECKLE-SHEARING-METHOD FOR THE MEASUREMENT OF DEFORMATIONS

The invention relates to a device with compact structure for observing test-piece surfaces for the measurement of deformations by the speckle-shearing method, having a coherent illumination of the test-piece surface, an image sensor (camera) and a two-beam interferometer used for imaging of the test-piece surface on the image sensor, the interferometer having two mirrors and a beam splitter.

With the speckle-shearing method, which is among others described in "Handbook for Experimental Stress Analysis, Ed. Christof Rohrbach, Publisher VDI 1989, p. 386–389", the test-piece surface to be tested and illuminated by coherent light is observed by camera takings, which consist of two optically superimposed partial images, which are slightly off-set with respect to each other. This off-set is produced by a double aperture or a prism in the imaging optical system. Both embodiments are not adapted to use of the phase shift technique introduced for interferometric measurements in combination with the electronic image evaluation.

Furthermore, no possibility of adjusting the shearing angle is provided.

DE-C-26 11 402 describes a process and a device for exactly adjusting the shearing off-set in a shearing interferometer system. The body of the basic interferometer consists of a beam splitter cube with terminal mirrors in both interferometer arms, which are formed as deviating prisms. Plane wave fronts in the interferometer region are achieved by collimating the beam path. The shearing off-set is adjusted by relative shifting of the deviating prisms. An imaging lens system is provided for detecting the object surface and for imaging on an image sensor.

A device known from U.S. Pat. No. 4,660,978 provides real time analysis of the distortion of wave fronts of an optical beam in the laboratory which are caused by the tested optical systems or are influenced thereby. The arrangement does not need a reference beam; it is formed as a shearing interferometer. The interferometer arms are terminated by plane mirrors and a parallel beam path is tested. An image of the test-piece surfaces onto the image sensor is not possible without supplementary aids.

In applied Optics, Vol. 13, No. 2, 1974, p. 233–234, a Michelson interferometer is proposed, wherein a divergence of the field by use of concave mirrors is proposed for improving the resolution and increasing the applied energy. Two spherical concave mirrors having the same radius of curvature are adjusted in such a manner that the centers of their radii of curvature come to lie on the surfaces of the splitting cube. The images of the sources also fall onto these surfaces and generate interference orders, and thus reasons of symmetry in the interferometer structure.

U.S. Pat. No. 4,193,693 describes the adjusting mechanism/control of an interference spectrometer, wherein both interferometer arms are terminated by concave mirrors and wherein one of the concave mirrors is adjustably arranged in the direction of the beam path for modifying the optical path. Therein the used concave mirrors ("cat eyes") have the purpose of focussing the parallel beam path in a respective interferometer arm on to a small area detector arranged in the focus.

In Applied Optics, Vol. 14, No. 3, 1975, p. 618–622 the speckle-shearing interferometry for surface-like strain measurement is described, wherein the principle of the double aperture speckle interferometer serves as a basis. One works with a 4-fold aperture, wherein simultaneous, so to speak superimposed takings for 4 shear directions result. This superimposition is resolved to the individual shearing directions with evaluation of the takings by a Fourier filter technique.

U.S. Pat. No. 4,725,144 describes a system for comparative measurement (testing of form fidelity) of the surface form of optical elements (e.g. concave mirrors). A Twyman-Green interferometer with coherent illumination is used. The terminating mirrors of the two interferometer arms are test object and comparison object. For reducing the number of the observed orders of interference, e.g. with comparison of an aspherical optic with a spherical concave mirror, adjusting mechanisms are mounted in the reference interferometer arm at the reference object and at a deviating mirror respectively, which deform these components in a controlled manner.

The construction of a marketable measurement device, which is closest to the state of the art, is a Twyman-Green interferometer arrangement and an electronic camera, such as is described in Applied Optics, Vol. 24, No. 14, 1985, p. 2177–2178. The interferometer essentially is composed of a beam splitter cube and two plane mirrors. The shearing is effected by tilting of one of these plane mirrors. Phase shifting is provided. It is effected by displacing one of two plane mirrors by a piezotranslator. The advantage of this device is the required large dimension of the used splitter cube, which is determined by the aperture of the camera objective and its aperture angle. The mass of the relatively large plane mirror has an unfavourable influence on its transient behaviour during the shifting operation for the serial reading of phase-shifted partial images of a scene. The whole measurement equipment is bulky, which often is disturbing with applications within the scope of non-destructive material testing. Exchange of objectives having different focal lengths/sizes for adapting to the measurement problem is possible only in a restricted manner with a beam splitter arranged in front and can only be performed in a complicated manner.

Starting with this prior art, the object underlying the invention is to provide a device of the first mentioned type, the device being constructed in a compact manner and being comparatively light, which allows performance of measurements also at inspection sites having a difficult accessibility, to shorten the transient behaviour of the mirror, and to be able to use interchangable lenses having different focal lengths and constructions.

This object is solved by the invention in that it provides a device for observing test-piece surfaces for deformation measurement by the speckle-shearing method with compact structure, having a coherent illumination of the test-piece surface, and an image sensor (camera) and a two-beam interferometer being used for imaging the test-piece surface onto the image sensor and having two mirrors and a beam splitter, wherein adjusting means are provided for displacing the mirrors in the longitudinal direction, and wherein concave mirrors of preferably the same focal length are formed in the Michelson interferometer arrangement as terminating mirrors and imaging optic.

A Michelson interferometer device according to the invention comprises terminating mirrors which are formed as concave mirrors having the same focal length. Off-set and direction for the shearing can be adjusted by means of two-axial displacement of a concave mirror transversely to the interferometer arm; alternatively the shearing can also be made by tilting of one of the two concave mirrors. Both partial images can be adjusted to an equal image scale by means of a device for displacing one of the two concave mirrors along the interferometer arm. The displacement of a concave mirror in the same direction by fractions of a light wavelength using a piezotranslator results in a path difference in view of the other interferometer arm, and thereby in a phase shift in the interference speckle pattern on the image sensor which can be used for applying the phase shift method.

Further embodiments of the invention are characterized in the dependent claims.

A measurement arrangement according to the invention uses exclusively the two concave mirrors of the interferometer apparatus for imaging the test-piece surface onto the image sensor of the camera. The focussing of the taking consisting of the two partial images is effected by displacing the image sensor (camera) with respect to the Michelson interferometer along the optical axis.

In the following, an embodiment, wherein the imaging system is extended by an objective lens, is described making use of FIG. 1.

The device illustrated therein with a Michelson interferometer serves the purpose of observing, in accordance with the shearing method, the speckle pattern coming from the test-piece surface 1 by illumination with coherent light, alternatively by incorporation of the phase-shift technique. Preferably the concave mirror/camera apparatus is designed for a 1:1 image of the intermediate image A of the test-piece surface 1 produced by the objective 2 onto the image sensor 7. The focal points 10 and 11 of the concave mirrors 6 and 8 can then of course lie within the splitter cube 3, which provides a very compact structure. For minimizing the size, it is suitable to select the focal lengths of the concave mirrors 6 and 8 such that these, as well as the image sensor 7 and objective 2, can be arranged directly behind the beam splitter cube 3. The beam splitter cube 3 has only a very small edge length. Advantageously the objective 2 is formed as an exchange objective or, alternatively, as a varioobjective. The objective 2 advantageously has an adjustable aperture for having an influence on the medium speckle size. If only concave mirrors are used as imaging optical means, then a separate aperture is appropriate for the same reason. The light coming from the objective 2 impinges into the splitter cube 3. The beam path branches into the two interferometer arms 4 and 5 of the Michelson interferometer apparatus.

The beam path in the interferometer arm 4 extends toward the rigid concave mirror 6 where it is reflected back through the splitter cube 3 onto the image sensor 7 of a camera and images the test-piece surface 1 thereon.

The beam path of the interferometer arm 5 extends toward an adjustable concave mirror 8. In contrast to an exactly symmetrical structure of both interferometer arms, this one has an axial off-set 9. This results in a tilting angle between the main axes of the two interferometer arms 4 and 5. Thereby, the projection center for the imaging onto the image sensor 7 is displaced. The image having axial off-set of the interferometer arm 5 superimposed on that of the interferometer arm 4 and produces, together with that, the shearing image on the image sensor 7. The axial off-set 9 can be adjusted by meter screws 13 and 14 in two directions transversely to the interferometer arm. The axial off-set 9 asserts size and direction of the shearing.

A further possibility of displacing the concave mirror 8 by means of a micrometer screw in the direction of the interferometer arm 5 serves the purpose of matching the image scale with respect to the other interferometer arm 4. For the determination of a phase portrait of the speckle pattern consisting of plural single takings (at least three), the speckle image is influenced by displacement of the concave mirror 8 in the longitudinal direction with respect to the interferometer arm 5 by fractions of a light wave length. This displacement is preferably made by means of a piezotranslator 12.

It is possible to replace the concave mirrors 6 and/or 8 of the device by the combination of a plane or convex mirror with a focussing lens arrangement.

I claim:

1. A device for observing an illuminated test-piece surface for deformation measurement in accordance with a speckle-shearing method, comprising:

lens means for receiving light reflected from said illuminated test-piece surface and for providing an optical output;

splitter means for splitting said optical output into two output beams traveling in substantially perpendicular paths;

first mirror means for receiving and reflecting a first one of said two output beams to produce a first reflected beam;

second mirror means for receiving and reflecting a second one of said two output beams to produce a second reflected beam; and sensing means for receiving and sensing said first and second reflected beams;

wherein said lens means comprises an objective lens disposed between said test-piece surface and said splitter means for converging and diverging the light reflected from said illuminated test-piece surface to produce an intermediate image of the illuminated test-piece surface, said intermediate image forming the optical output of said lens means, said intermediate image being split by said splitter means and reflected by said first and second mirror means, whereupon it is imaged onto said sensing means; and wherein said first and second mirror means comprise concave mirrors of equal focal length, said device further comprising adjusting means for longitudinally and transversely adjusting the position of said concave mirrors.

2. The device of claim 1, wherein said splitter means comprises a beam splitter cube.

3. The device of claim 1, wherein said optical output of said lens means travels in a first direction, said first one of said two output beams travels in said first direction, and said second one of said two output beams travels in a second direction perpendicular to said first direction.

4. The device of claim 1, wherein said adjusting means comprises a piezotranslator operatively associated with one of said first and second mirror means for moving said one of said first and second mirror means along a main axis corresponding to a direction of travel of said one of said two output beams reflected by said one of said first and second mirror means.

5. The device of claim 1, wherein said adjustment means comprises at least one adjustment screw for adjusting at least one of said first and second mirror means with respect to a main axis defined by a direction of travel of said one of said two output beams reflected by said at least one of said first and second mirror means.

6. The device of claim 5, wherein said at least one adjustment screw adjusts said at least one of said first and second mirror means by transverse displacement with respect to said main axis.

7. The device of claim 5, wherein said at least one adjustment screw adjusts said at least one of said first and second mirror means by tilting with respect to said main axis.

8. The device of claim 1, wherein said adjustment means comprises at least one adjusting screw for adjusting at least one of said first and second mirror means along a direction of travel of a corresponding one of said two output beams reflected by said at least one of said first and second mirror means.

9. The device of claim 1, wherein said concave mirrors have a focal length which is selected to be of such a value that said concave mirrors can be arranged directly behind said splitter means.

10. The device of claim 1, wherein said intermediate image produced by said objective lens is imaged onto said sensing means in accordance with 1:1 imaging.

* * * * *